(12) United States Patent
Probst

(10) Patent No.: US 10,052,992 B2
(45) Date of Patent: Aug. 21, 2018

(54) TRAVEL PLAY TRAY

(71) Applicant: Alyson Probst, Denver, CO (US)

(72) Inventor: Alyson Probst, Denver, CO (US)

( * ) Notice: Subject to any disclaimer, the term of this patent is extended or adjusted under 35 U.S.C. 154(b) by 0 days.

(21) Appl. No.: 15/128,343

(22) PCT Filed: May 19, 2016

(86) PCT No.: PCT/US2016/033207
§ 371 (c)(1),
(2) Date: Sep. 22, 2016

(87) PCT Pub. No.: WO2016/187390
PCT Pub. Date: Nov. 24, 2016

(65) Prior Publication Data
US 2018/0043809 A1    Feb. 15, 2018

Related U.S. Application Data

(60) Provisional application No. 62/163,464, filed on May 19, 2015.

(51) Int. Cl.
*B60N 3/00* (2006.01)
*A47B 23/00* (2006.01)

(52) U.S. Cl.
CPC ............ *B60N 3/002* (2013.01); *A47B 23/002* (2013.01)

(58) Field of Classification Search
CPC ...... B60N 3/001; B60N 3/002; A47B 23/002; A47B 23/041
See application file for complete search history.

(56) References Cited

U.S. PATENT DOCUMENTS

| 5,467,853 | A | * | 11/1995 | Pelletier | A45C 9/00 190/11 |
| 5,503,891 | A | * | 4/1996 | Marshall | B32B 27/18 428/99 |
| 5,680,973 | A | | 10/1997 | Vulpitta | |
| 6,305,656 | B1 | * | 10/2001 | Wemyss | A47G 23/0216 206/5 |

(Continued)

OTHER PUBLICATIONS

"The Gadgeteer: Star Kids Products Snack and Play Travel Tray Review" by (Preston) Apr. 29, 2009; p. 4; p. 5; Figures 1 and 2, p. 8; figure 2, p. 7.

(Continued)

*Primary Examiner* — Daniel J Rohrhoff
(74) *Attorney, Agent, or Firm* — Leyendecker & Lemire, LLC

(57) ABSTRACT

A travel tray having a flexible magnetically receptive, dry erase play surface permitting a child user to "stick" magnetic pieces to the play surface as desired as well as write or draw on the play surface using non-toxic dry erase markers is described. Variations include side pockets to store play items, such as markers, magnets, small toys and snacks. The side pockets typically include a mesh outer layer permitting a child or caretaker to see what is contained in the pockets at a glance without having to reach therein. In one variation a side pocket having a solid waterproof fabric outer layer is provided wherein the pocket is sized to receive a beverage container and includes an opening lined with an elastic band to assist in holding the container in place in an upright orientation.

31 Claims, 11 Drawing Sheets

(56) References Cited

U.S. PATENT DOCUMENTS

| | | | | |
|---|---|---|---|---|
| D550,477 S | * | 9/2007 | Probst | D6/406.5 |
| 8,091,486 B1 | * | 1/2012 | Broaddrick | A47B 23/002 108/25 |
| 9,560,919 B2 | * | 2/2017 | Terhune | A47D 1/004 |
| D781,062 S | * | 3/2017 | Probst | D6/406.5 |
| D795,789 S | * | 8/2017 | Ehtesham | D12/425 |
| 2005/0092212 A1 | * | 5/2005 | Simon | A47B 23/00 108/43 |
| 2007/0029848 A1 | * | 2/2007 | Probst | A47B 23/00 297/148 |
| 2007/0029884 A1 | | 2/2007 | Probst | |
| 2007/0277711 A1 | * | 12/2007 | Grant | A47B 23/002 108/160 |
| 2009/0206115 A1 | | 8/2009 | Gleason | |
| 2016/0325197 A1 | * | 11/2016 | Smith | A63H 33/006 |
| 2017/0150837 A1 | * | 6/2017 | Flannery | A47G 23/0608 |

OTHER PUBLICATIONS

"SpongeBob Square Pants Universal Activity Tray iPad/iPad2" by (CTA Digital) Aug. 9, 2012; entire document.
"Snak & Play Travel tray" (Star Kids) https://web.archive.org/web/20141229181942/http://www.starkidsproducts.com/snack-play-travel-tray/;Dec. 29, 2014; entire document.

* cited by examiner

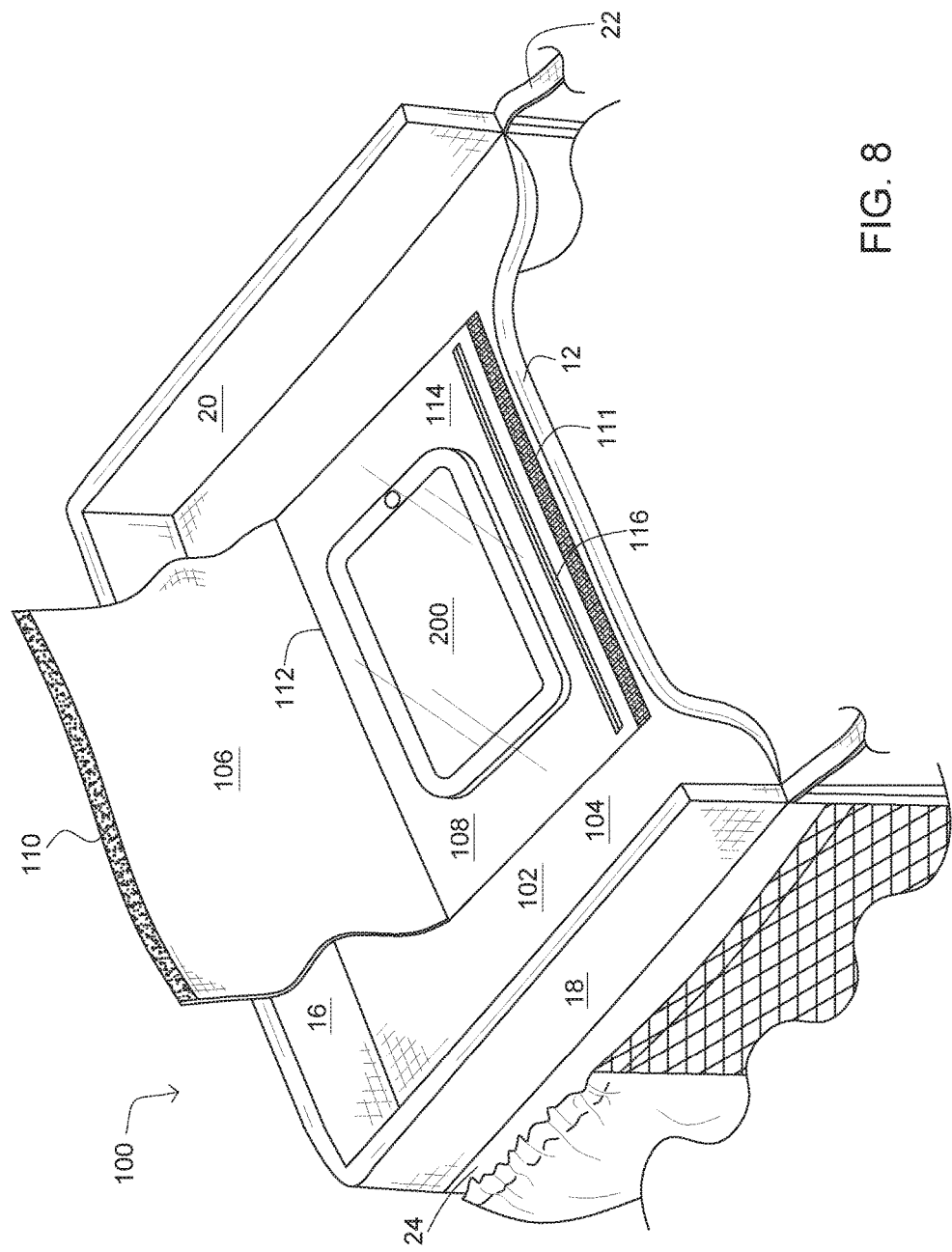

TRAVEL PLAY TRAY

RELATED APPLICATIONS

This application claims priority to and incorporates by reference U.S. Provisional Patent Application 62/163,464 filed on May 19, 2015 having the title Travel Play Tray and having the same inventor.

BACKGROUND

Child travel trays are known, such as the travel tray described in published United States patent application 20070029848, which is fully incorporated herein by reference.

Prior art trays often lack a place to conveniently place or store a drink. Cup holders recessed into the surface of the tray may be provided but they take away from the usable real estate offered by the tray. Side pockets may be provided but they are typically comprised of a mesh fabric so that users can easily see the contents therein and as such do little to contain any liquid that might spill from a beverage cup or container. Further, side pockets are often not sized to hold a cup or container in an upright position, i.e. they can be too wide.

The play surface of a typical travel tray is flat and includes one or more upwardly extending sidewalls surrounding its edges. The construction of the planar portion underlying the play surface and each of the sidewalls most typically comprises foam sheet material and/or a plastic sheet covered in a suitable fabric, such as nylon or polyester fabric. The play surface is typically sufficiently rigid to support a child's toys and books while he/she plays and uses them. Further, the surface can be used to support paper and coloring books for drawing, coloring and writing on the paper and/or coloring books. The surface can also be used as a surface on which snacks or other food stuffs are placed while the child is eating.

BRIEF DESCRIPTION OF THE DRAWINGS

FIG. 8 is a top rear perspective view of a travel tray incorporating a pouch for electronics and other devices according to another embodiment of the present invention.

DETAILED DESCRIPTION

Figure 1A:
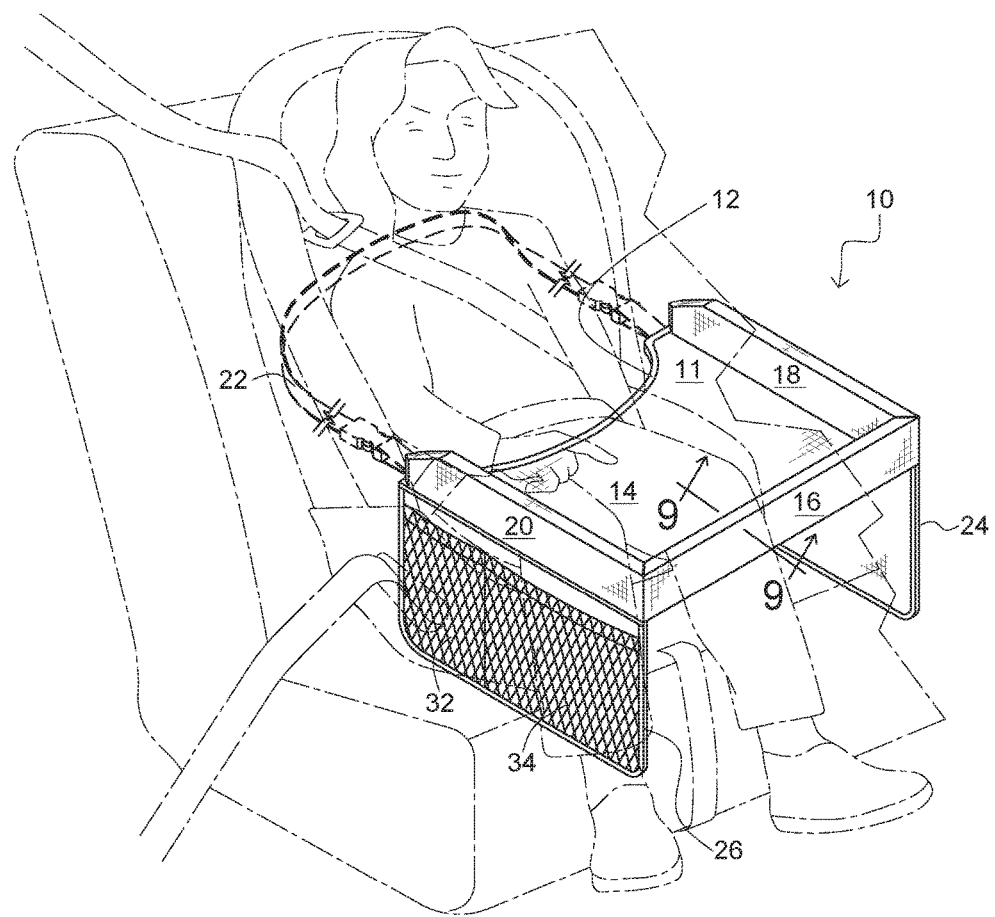
FIG. 1A is a front right perspective view of the travel tray with a child shown in dashed line indicating how the tray can be used according to the present invention.
Figure 1B:
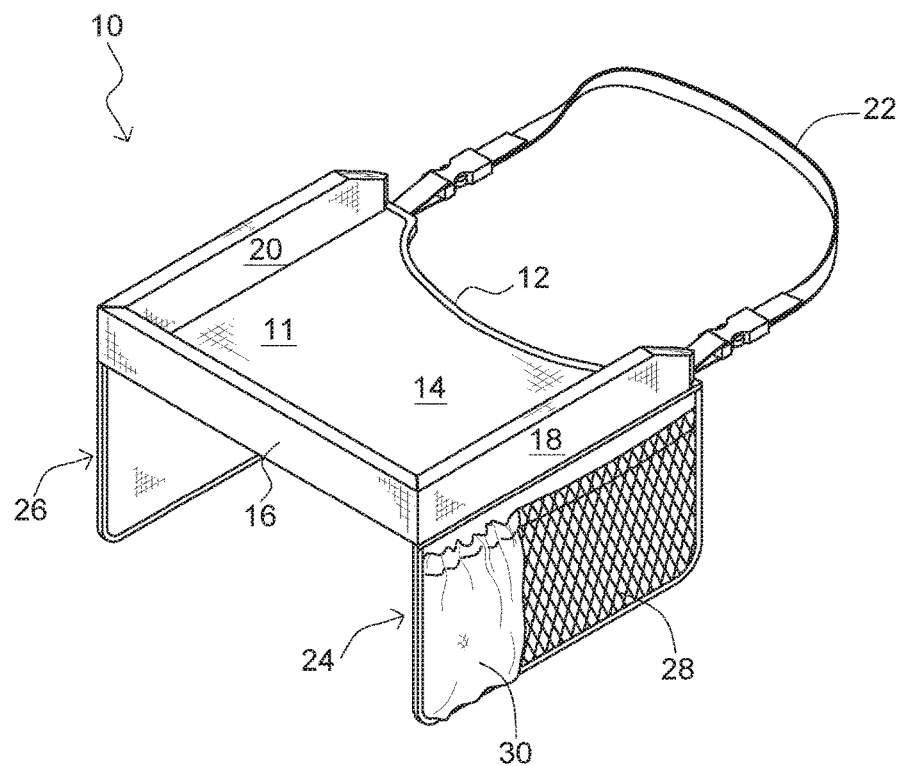
FIG. 1B is a front left perspective view of the travel tray according to the present invention.

Embodiments of the invention comprise a travel tray having a flexible magnetically receptive, dry erase play surface permitting a child user to "stick" magnetic pieces to the surface as desired as well as draw on the surface using non-toxic dry erase markers. Variations include side pockets to store play items, such as markers, magnets, small toys and snacks. The side pockets typically include a mesh outer layer permitting a child or caretaker to see what is contained in the pocket at a glance without having to reach therein. In one variation a side pocket is having a solid waterproof fabric outer layer is provided wherein the pocket is sized to receive a beverage container and includes an opening lined with an elastic band to assist in holding the container in place in an upright orientation.

In another embodiment of the travel tray, all of a portion of the play surface can be lifted and either folded or rolled away from the top of the tray to reveal a horizontal pocket with a clear front or upper side wherein a tablet or other suitable electronic device can be received. The pocket can include a closure, such as a plastic zipper seal or mating hook and loop strips. Ideally, the clear upper side of the pocket is thin enough and constructed to permit a user to operate the tablet by way of its touch screen. When the pocket is not in use the play surface can be placed back over it, secured in place permitting any suitable use thereof.

Terminology

The terms and phrases as indicated in quotes (" ") in this section are intended to have the meaning ascribed to them in this Terminology section applied to them throughout this document, including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

The phrase "magnetically receptive" as used in this specification and the appended claims refers to a material or element that is either magnetic or is subject to magnetic force when a magnet is brought into close proximity with the element or material. Typically, this requires the associated element or material to comprise one or both of ferrite or magnetic material.

A First Embodiment of a Travel Tray

A first embodiment travel tray 10 is illustrated in FIGS. 1-7 & 9. The travel tray comprises: (i) a generally rectangular planar portion 11 with a concave front side 12 that defines a generally horizontally disposed play surface 14; (ii) rear, left and right side walls 16, 18 & 20 that extend upwardly from the edges of the planar portion; (iii) an adjustable strap assembly 22 that forms a loop with the concave front side to secure the tray to a child; and (iv) left and right fabric flaps 24 & 26 that hang downwardly from the respective left and right sides and include various pockets 28-34 disposed thereon.

Figure 9A:
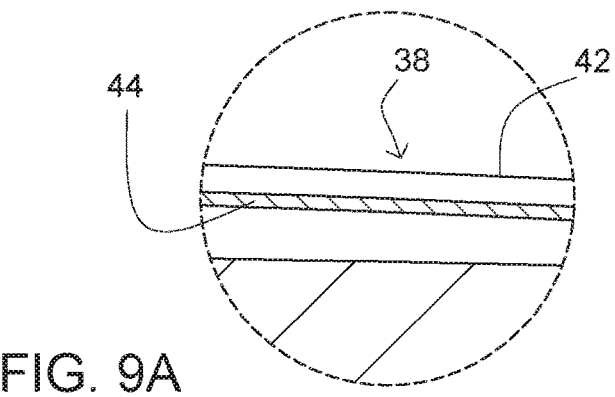
FIG. 9 is a cross section of the planar play portion of the tray incorporating a magnetically receptive material taken along line 9-9 of FIG. 1*a* according to one embodiment of the present invention.
Figure 9:
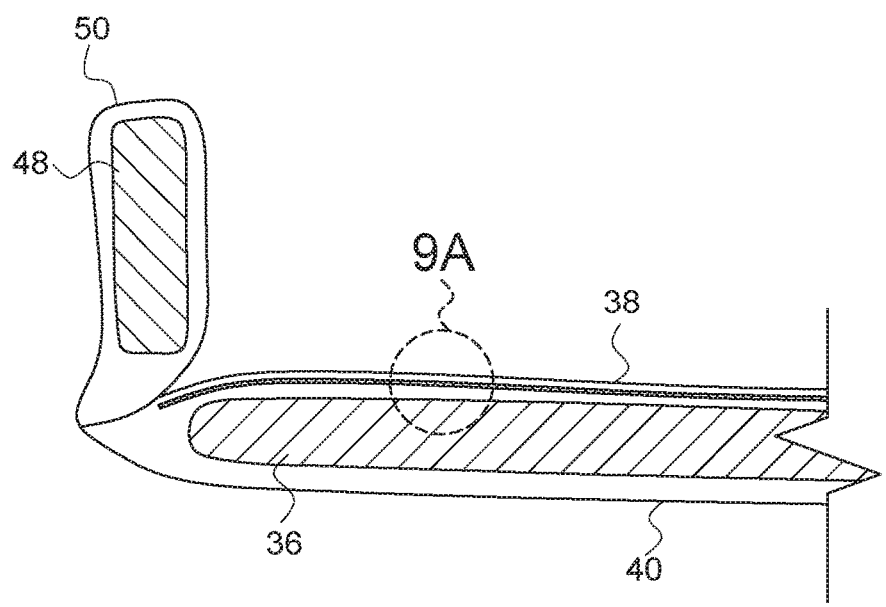

The planar portion is typically comprised of a foam material core 36 that is sandwiched by a top panel 38 defining play surface 14 and a bottom panel 40, both made of flexible sheet materials as shown in the cross section of FIG. 9. One variation is the play surface 14 is about 13" by 16" in size with the concave front side 12 configured to fit up against the belly of an intended user when the tray is secured in place for use around the torso of a child using the adjustable strap 22.

The medium density open cell foam 36 is about 0.50" thick and in combination with the flexible top and bottom panels 38 & 40 form a sandwich structure that provides a sufficiently stiff surface to support play things and food but is compliant enough to absorb impact and mitigate potential injury. The panels, which may be made of different materials, are typically joined around the perimeter of the planar portion 11.

Figure 10:
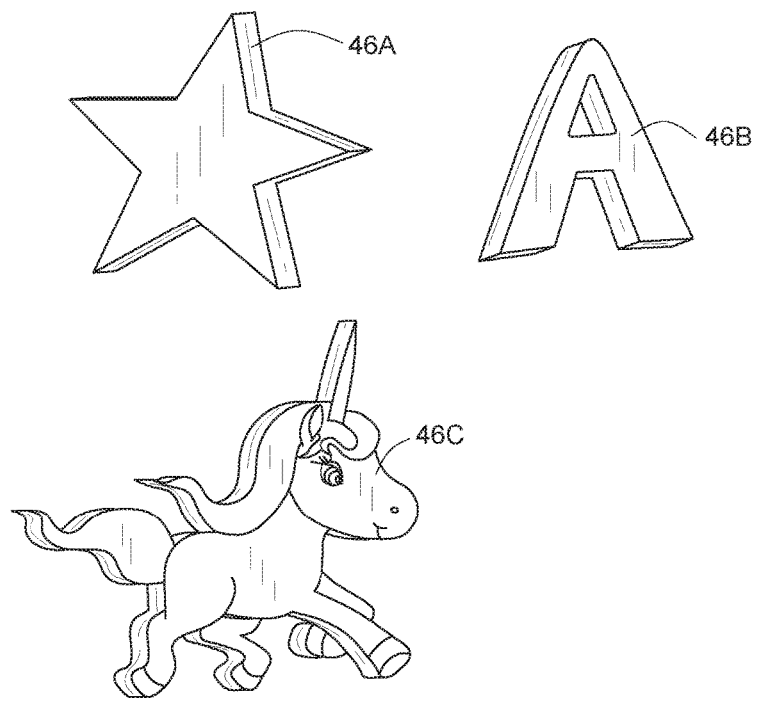
FIG. 10 is an illustration of several magnetic pieces that can be used with embodiments of the present invention.
Figure 11:
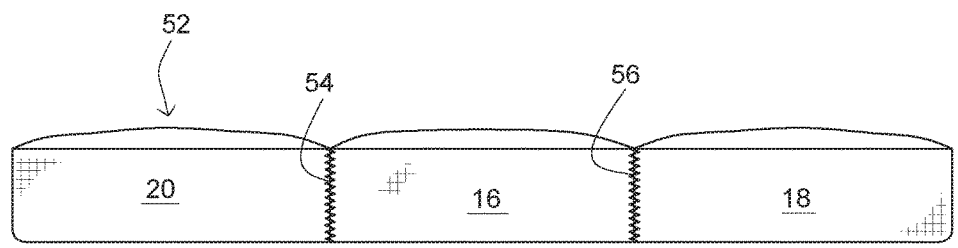
FIG. 11 is a perspective view of the sidewall portion of the play tray prior to attachment thereto according to the present invention.

The bottom panel 40 typically comprises a woven synthetic fabric such as nylon or polypropylene. The fabric can be coated to impart water resistance to it. Top panel 38 is comprised of flexible laminate, also known as RubberSteel® rewriting board made by Magnum Magnetics of Marietta, Ohio, having thin top and bottom layers. The top layer 42 comprises a flexible sheet of plastic that is most often white and has a relatively slick non-porous top surface. The material is selected as compatible with dry erase type markers so that a user may selective write on and erase the top surface as desired. The bottom layer 44 comprises a flexible polymeric material filled with a relatively high percentage of magnetically receptive ferrite particles. This layer imparts magnetic receptiveness through the top layer 42 wherein magnets placed on the play surface 14 of the play portion 11 stick thereto. As shown in FIG. 10, magnetic shapes 46a-c and other figurines and toys can be provided with the tray 10 or obtained separately for use with the travel tray.

The rear, left and right sidewalls 16, 18 & 20 extend upwardly to a height of about 2" from the respective rear, left and right edges of the play portion 11. The sidewalls comprise an open cell foam core 48 sandwiched on all sides by a piece of flexible sheet material 50, typically a woven synthetic fabric as shown in FIG. 9. In at least one variation, all three walls comprise a singular strip 52 of fabric sandwiched foam 48 wherein the longitudinally extending bottom edge of the encapsulating fabric piece 50 is sewn to the respective edges of the planar portion 11. The strip 52 is sewn to form vertical seams 54 & 56 compressing the foam and permitting the strip to bend at the intersecting corners of the left and rear sidewall edge and the right and rear sidewall edge. The soft construction of the sidewalls as with the planar portion 11 reduces the risk of a child being injured should his/her head or other body part collide with the sidewalls, such as might occur in an car accident or during an emergency stop of a vehicle in which the child and the tray are located.

Figure 4:
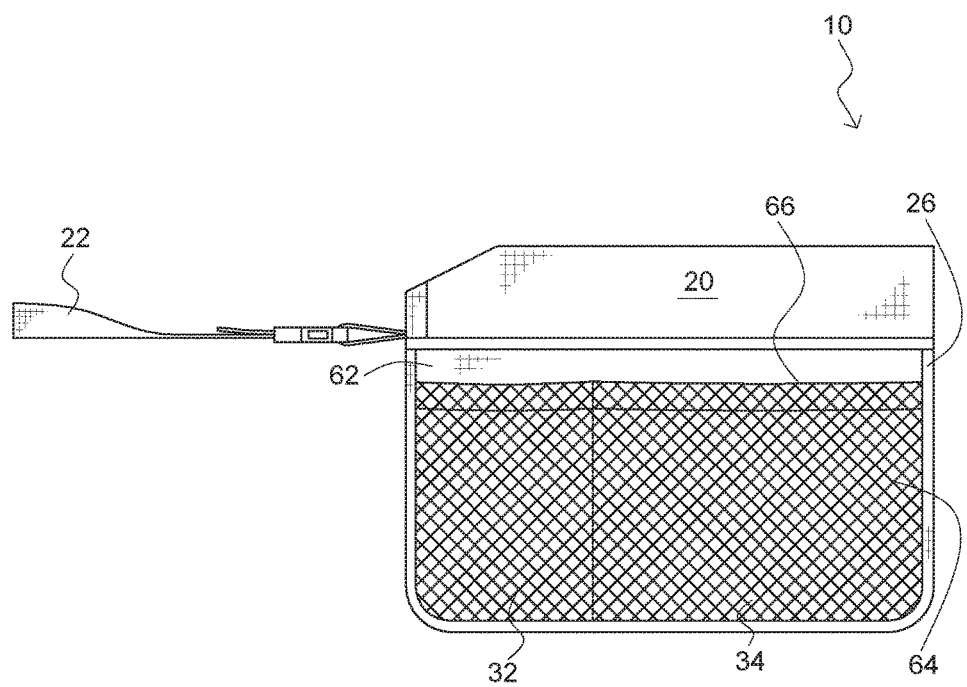
FIG. 4 is a right side view of the travel tray according to the present invention.
Figure 5:
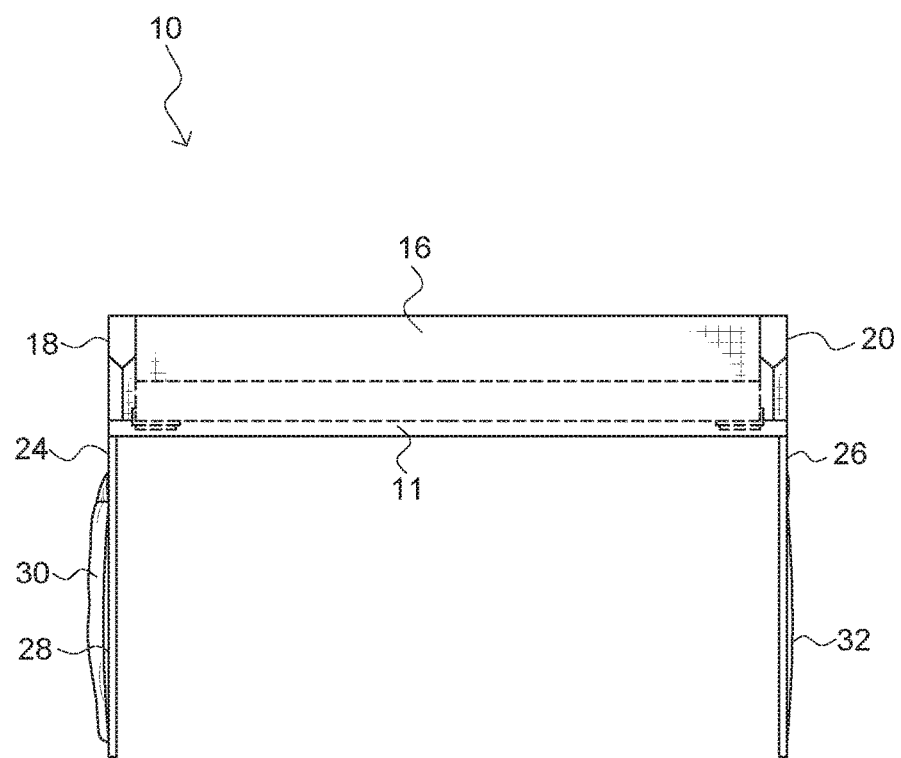
FIG. 5 is a rear view of the travel tray according to the present invention.
Figure 6:
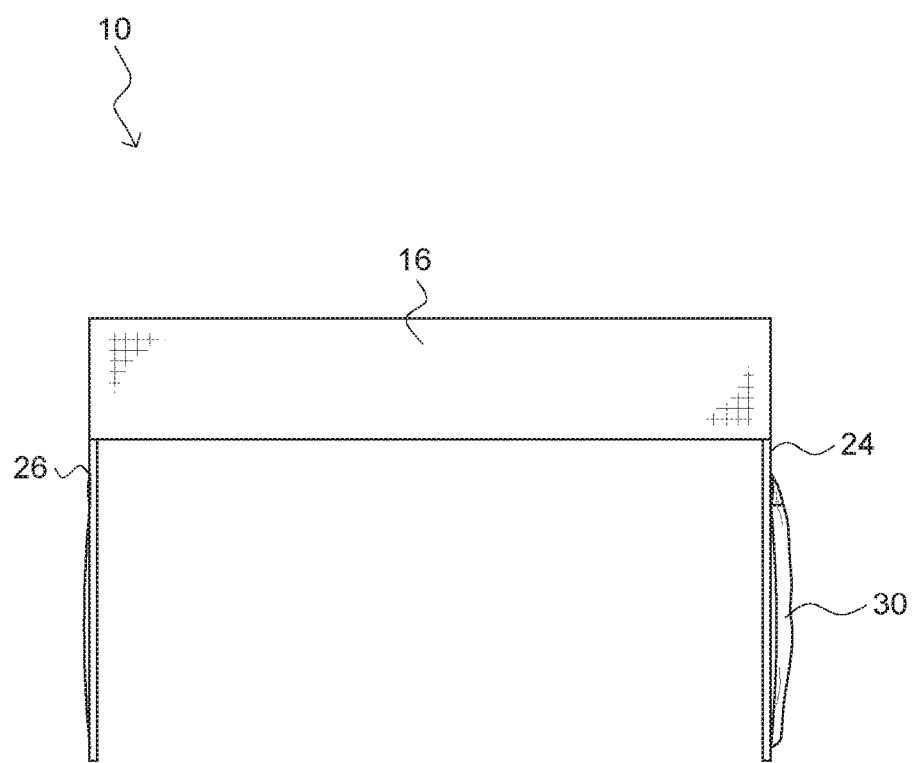
FIG. 6 is a front view of the travel tray according to the present invention.
Figure 7:
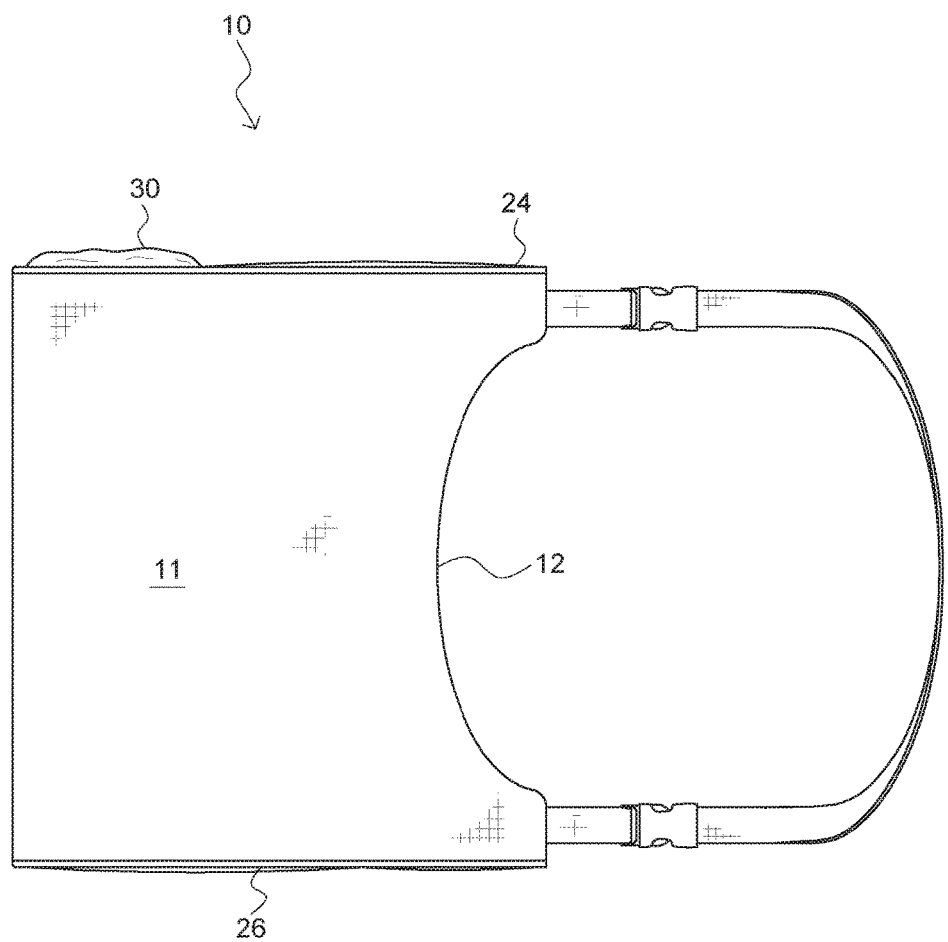
FIG. 7 is a bottom view of the travel tray according to the present invention.

The left and right fabric flaps 24 & 26 hang downwardly from the left and right edges of the planar portion 11. As shown each flap includes two pockets formed thereon. The right flap 26 as best shown in FIG. 4 comprises a solid fabric layer 62 (typically, nylon or polyester fabric) over which a mesh fabric 64 has been sewn or otherwise attached to form a large pocket 32 and a small pocket 34. The pockets can be used to store any suitable items, such as snacks, dry erase markers, and magnets. The mesh fabric permits the contents of the pockets to be visible from the outside. The top edge 66 of the pockets form a sleeve in which a strip of elastic material is received. As shown the right front pocket 34 is smaller and has a shorter opening than that of the larger right rear pocket 32.

Figure 3:
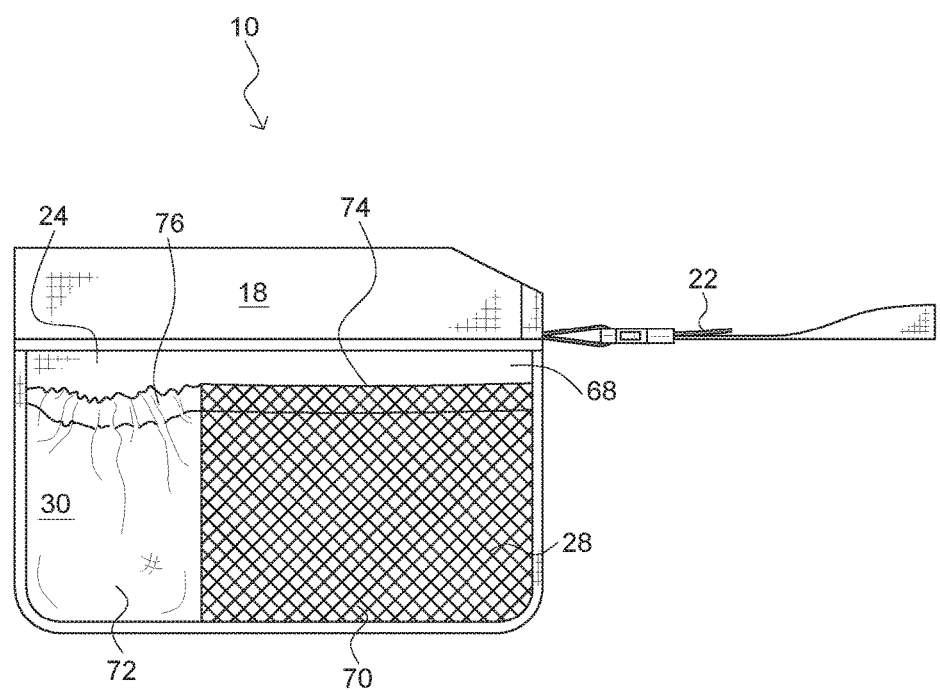
FIG. 3 is a left side view of the travel tray according to the present invention.

The left flap 24 as best shown in FIG. 3 comprises a solid fabric layer 68 (also typically, nylon or polyester fabric) over which a mesh fabric 70 has been sewn or otherwise attached to a portion of the flap to form a large left front pocket 28. The mesh fabric permits the contents of the pocket to be visible from the outside. A small left rear pocket 30 is formed from a piece of waterproof/water resistant woven fabric 72 that is sewn or otherwise attached to the flap. Of significance the length of the woven fabric is greater than the length of the pocket opening. Both the mesh 70 and the woven fabric 72 is formed into a sleeve at the top edges 74 & 76 of the respective pockets wherein a strip of elastic is received. However, since the woven fabric of the left rear pocket is longer than the opening and incidentally the associated portion of the elastic strip, the woven fabric 72 bunches around the opening. In use the longer length of the woven fabric and the elastic bunching of the rear pocket's opening allows it to receive larger items therein, such as beverage bottles. The elastic strip expands and grips the portion of a beverage bottle extending beyond the top edge of the pocket and acts to grip and hold the bottle in place therein reducing the risk of it falling out and spilling its contents. In some variations both the flap fabric and the front pocket woven fabric are of the waterproof/water resistant variety wherein, depending on the manner in which the pocket fabric is joined to the flap fabric, a water resistant/waterproof pocket is created. The left rear pocket 72 is therefore able to contain incidental spilled liquid and liquid condensation forming on the exterior of a beverage bottle received in the pocket. This helps protect and keep the underlying seat of the car dry.

Figure 2:
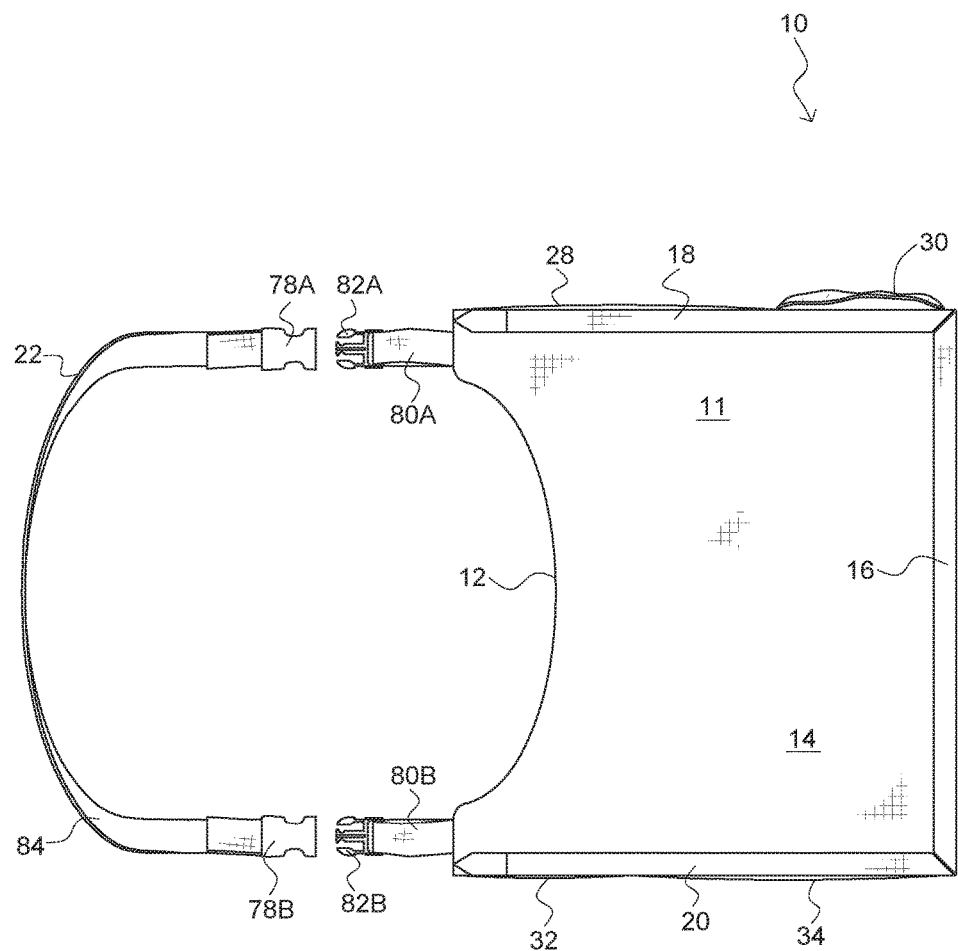
FIG. 2 is a top view of the travel tray according to the present invention.

The adjustable strap assembly 22 is best seen in FIG. 2. It is configured to be received around the waist of a child in order to secure the travel tray 10 in place and prevent it from sliding off of the child's lap during use. In the illustrated embodiment, the assembly comprises left and right side release buckle female portions 78a&b attached to the front side of the planar play portion 11 on respective left and right sides of the concavity thereof by way of short pieces of fabric webbing 80a&b. The male portions 82 a&b of the side release buckles are adjustably attached to a long piece of fabric webbing 84. The type of buckles, their locations, as well as the particular configuration of the various webbing pieces can vary. Further, hook and loop type attachments, snaps or buttons can be used in place of buckles.

A Second Embodiment of a Travel Tray

FIG. 8 is an illustration of a second embodiment travel tray 100. Except for variations and modifications of the planar portion 102, it is substantially similar to the first embodiment having similar sidewalls and pocketed flaps. Accordingly, as applicable in FIG. 8, substantially similar elements have been identified with the same element numbers as the first embodiment and will not be further described in this section.

The planar play portion 102 includes a foam core construction similar to the planar play portion of the first embodiment wherein top and bottom panels sandwich a foam core except the top panel 104 includes a flap 106 that can be moved away and either folded or rolled up to reveal a pouch 108. The top panel including the flap is typically comprised of a flexible plastic having a smooth and white outside surface suitable for use with dry erase markers. The top panel can comprise a laminate having a second layer located below the white surfaced top layer. The second layer can comprise a ferrite rich magnetically receptive flexible rubber-like material.

The flap 106 is typically centered on the planar play portion's top surface and includes a front edge having a strip of hook and loop material 110 secured thereto that corresponds to a piece of hook and loop material 111 near the front edge of the planar play portion. The flap comprises part of the top panel 104 with its rear edge 112 being attached to the top panel and forming a living hinge therewith.

Underneath the flap and resting on the underlying foam layer is the pouch 108 or enclosure having a clear plastic top side 114. The pouch, which typically includes an opening 116 proximate to the front edge of the planar play portion, is configured to receive and hold a cell phone or tablet 200 therein. The clear plastic top side allows the tablet or phone to be viewed and permits touch screen operation thereof, but the pouch protects the electronic device from being damaged by spills and food particles. The pouch opening can include a closure to tightly seal the electronic device therein to protect it. The closure can include a plastic zipper with or without a slider.

The inside surface of the pouch and particularly the bottom inside surface thereof can be configured to exhibit a high degree of friction to help hold the electronic device in place and prevent it from easily sliding around when contained within the pouch. The bottom inside surface can be similar in its tactile properties to cell phone sticky pads as are used to keep cell phones in place on car dashes.

The pouch and the flap can be implemented in variations that essentially accomplish the same purpose as the illustrated version but would be obvious to one of ordinary skill given the benefit of this disclosure. For instance, the flap could comprise the substantial majority of the planar portion's top panel with the left, right and rear edges thereof extending to the edges where the planar play portion intersects with the various sidewalls. The pouch closure can also comprise a hook and loop material or snaps instead of the plastic zipper.

A Method of Using a Travel Tray

Embodiments of the travel tray are typically used by a young child while traveling, such as by automobile, when secured in a child seat. First the child is secured in the child seat, then the strap assembly is disconnected at one or more provided buckles and thread around the child's waist. The strap can be rebuckled and its length adjusted to ensure the tray will not slide off of the child's lap.

As desired, toys and food can be placed either or both on the play surface or in one or more of the side pockets. A drink can be placed in the waterproof/water resistant pocket wherein the elastic band around the pocket opening can help secure the bottle or other beverage receptacle containing the drink.

Toys can include magnetic figures and pieces, non-toxic kid-safe dry erase markers and any other suitable toy that will fit on the play surface. While traveling the child can use the play surface to retain his/her toys, as a shelf for his/her snacks or as a drawing surface. The side pockets provide a convenient location to store toys and food. When thirsty the child can easily remove the beverage receptacle from the provided pocket and return it to the pocket when done.

Where a second embodiment type travel tray is provided, a phone or tablet can be placed and secured in the pouch by a caregiver. The caregiver may roll up or fold away the play surface flap to provide access to the electronic device, which can for instance by used to display a video or interactive game. If, however, the play surface is to be used to contain the child's food or playthings, the electronic device can be removed (or optionally left in place) from the pouch and the flap can be unfolded and secured so that it becomes part of the play surface.

Variations and Other Embodiments

The various embodiments, methods and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

For instance, in some variations of the second embodiment the flap may comprise essentially the totality of the play surface that can be rolled or folded up as desired to reveal the underlying pouch. In one variation the back surface of the pouch can be the foam material, which provides suitable friction to help hold a tablet in place. In another variation, a section of foam can be removable, thereby creating a compartment for the tablet or phone within the pouch. In yet another variation, openings can be provided into the pouch perhaps on one side or through the bottom of the play tray wherein charging cords can be threaded into the pouch for connection to the electronic device. Further, a pocket can be provided in the travel tray such as on the backside of one of the side flaps that can have a rechargeable battery pack contained therein to power the electronic device.

I claim:

1. A portable travel tray comprising:
   a planar play portion having a substantially flat and planar top surface and being bounded by front, rear, left and right edges, the front edge being convexly contoured, the planar play portion having a sandwich construction comprising a flexible top panel and a flexible bottom panel encapsulating a play portion flexible foam core, the top panel having a smooth, generally white, dry erase compatible top surface;
   rear, left and right sidewalls extending upwardly from the rear, left and right edges respectively, each sidewall having a sandwich construction comprising a sidewall flexible sheet material encapsulating a sidewall flexible foam core; and
   a strap assembly, the strap assembly having first and second ends attached to the front edge generally proximate respective intersections with the left and right edges, the strap assembly comprising at least one elongated strap and at least one attachment mechanism permitting the assembly to be secured around a user;
   wherein (1) the flexible top panel comprises a top and bottom layer laminate, the top layer comprising a polymeric sheet, and a bottom layer comprising a magnetically receptive composite material; and (2) the magnetically receptive composite material comprises ferrite particles contained in an elastomeric matrix.

2. A portable travel tray comprising:

a planar play portion having a substantially flat and planar top surface and being bounded by front, rear, left and right edges, the front edge being convexly contoured, the planar play portion having a sandwich construction comprising a flexible top panel and a flexible bottom panel encapsulating a play portion flexible foam core, the top panel having a smooth, generally white, dry erase compatible top surface;

rear, left and right sidewalls extending upwardly from the rear, left and right edges respectively, each sidewall having a sandwich construction comprising a sidewall flexible sheet material encapsulating a sidewall flexible foam core;

a strap assembly, the strap assembly having first and second ends attached to the front edge generally proximate respective intersections with the left and right edges, the strap assembly comprising at least one elongated strap and at least one attachment mechanism permitting the assembly to be secured around a user; and a pouch having a clear plastic pouch top side, and wherein the pouch is located between the flexible top panel and the play portion flexible foam core, and wherein the flexible top panel further includes a top panel flap positioned over the pouch whereby the flap can be lifted to reveal the pouch and provide access to the pouch.

3. The portable travel tray of claim 2, wherein the top panel flap includes a hook and loop flap closure.

4. The portable travel tray of claim 2, wherein the pouch includes a pouch closure.

5. The portable travel tray of claim 4, wherein the pouch closure comprises a plastic zipper.

6. The portable travel tray of claim 2, wherein the top panel flap comprises only a portion of the flexible top panel and is centered left to right on the flexible top panel.

7. A portable travel tray comprising:

a planar play portion having a substantially flat and planar top surface and being bounded by front, rear, left and right edges, the front edge being convexly contoured, the planar play portion having a sandwich construction comprising a flexible top panel and a flexible water resistant fabric bottom panel encapsulating a play portion flexible foam core, the top panel comprising a laminate having a top layer with a smooth, generally white, dry erase compatible top surface and a magnetically receptive bottom layer;

rear, left and right sidewalls extending upwardly from the rear, left and right edges respectively, each sidewall having a sandwich construction comprising a flexible water resistant sidewall fabric encapsulating a sidewall flexible foam core;

left and right pocket flaps, each flap extending downwardly from an intersection with one of the respective left and right edges, each flap comprising a flexible water resistant flap fabric and including a plurality of pockets formed therein wherein at least a first pocket of the plurality pockets of at least one of the left and right pocket flaps comprises a beverage pocket including (i) an outer side including a water resistant fabric and (ii) an elastic opening configured to grip a beverage container when a beverage container is inserted therein and wherein each flap includes at least one pocket of the plurality of pockets having an outer side comprising a see-through mesh material;

a strap assembly, the strap assembly having first and second ends attached to the front edge generally proximate respective intersections with the left and right edges, the strap assembly comprising at least one elongated strap and at least one attachment mechanism permitting the assembly to be secured around a user; and a pouch having a clear plastic pouch top side wherein the pouch is located between the flexible top panel and the play portion flexible foam core, and wherein the flexible top panel further includes a top panel flap positioned over the pouch whereby the flap can be lifted to reveal the pouch and provide access to the pouch.

8. The portable travel tray of claim 7, wherein the top panel flap includes a hook and loop flap closure.

9. The portable travel tray of claim 7, wherein the pouch includes a pouch closure.

10. The portable travel tray of claim 9, wherein the pouch closure comprises a plastic zipper.

11. The portable travel tray of claim 7, wherein the top panel flap comprises only a portion of the flexible top panel and is centered left to right on the flexible top panel.

12. A portable travel tray comprising:

a planar play portion having a substantially flat and planar top surface and being bounded by front, rear, left and right edges, the front edge being convexly contoured, the planar play portion having a sandwich construction comprising a flexible top panel and a flexible bottom panel encapsulating a play portion flexible foam core, the top panel having a smooth, generally white, dry erase compatible top surface;

rear, left and right sidewalls extending upwardly from the rear, left and right edges respectively, each sidewall having a sandwich construction comprising a sidewall flexible sheet material encapsulating a sidewall flexible foam core;

a pouch having a clear plastic pouch top side, wherein the pouch is located between the flexible top panel and the play portion flexible foam core, and wherein the flexible top panel further includes a top panel flap positioned over the pouch whereby the flap can be lifted to reveal the pouch and provide access to the pouch; and a strap assembly, the strap assembly having first and second ends attached to the front edge generally proximate respective intersections with the left and right edges, the strap assembly comprising at least one elongated strap and at least one attachment mechanism permitting the assembly to be secured around a user.

13. The portable travel tray of claim 12, further comprising:

left and right pocket flaps, each flap extending downwardly from an intersection with one of the respective left and right edges, each flap comprising a flexible sheet material and including one or more pockets formed therein.

14. The portable travel tray of claim 13, wherein at least a first pocket of the one or more pockets of at least one of the left and right pocket flaps comprises an outer side including a mesh see-through fabric.

15. The portable travel tray of claim 13, wherein at least a first pocket of the one or more pockets of at least one of the left and right pocket flaps comprises a beverage pocket with an outer side including a water resistant fabric.

16. The portable travel tray of claim 14, wherein at least a second pocket of the one or more pockets of at least one of the left and right pocket flaps comprise an outer side including a water resistant fabric.

17. The portable travel tray of claim 15, wherein the beverage pocket includes an elastic opening configured to grip a beverage container when a beverage container is inserted therein.

18. The portable travel tray of claim 13, wherein the flexible sheet material of each flap comprises a flap fabric.

19. The portable travel tray of claim 18, wherein the flap fabric is water resistant.

20. The portable travel tray of claim 18, wherein at least a first pocket of the one or more pockets of at least one of the left and right pocket flaps comprises a beverage pocket with an outer side including a water resistant fabric.

21. The portable travel tray of claim 20, wherein the beverage pocket includes an elastic opening configured to grip a beverage container when a beverage container is inserted therein.

22. The portable travel tray of claim 13, wherein one of the left flap and the right flap includes a first pocket and a second pocket, the first and second pocket each having an outer side comprising mesh see-through fabric.

23. The portable travel tray of claim 22, wherein the other of the left flap and the right flap includes a third pocket and a forth pocket, the third pocket having an outer side comprising mesh see-through fabric and the fourth pocket having an outer side comprising water resistant fabric.

24. The portable travel tray of claim 12, wherein the flexible bottom panel comprises a woven fabric.

25. The portable travel tray of claim 12, wherein the sidewall flexible sheet material comprises a woven fabric.

26. The portable travel tray of claim 24, wherein the sidewall flexible sheet material comprises the woven fabric.

27. The portable travel tray of claim 12, wherein the play portion flexible foam core comprises an open cell foam.

28. The portable travel tray of claim 12, wherein the sidewall flexible foam core comprises an open cell foam.

29. The portable travel tray of claim 12, wherein the flexible top panel comprises a top and bottom layer laminate, the top layer comprising a polymeric, and a bottom layer comprising a magnetically receptive composite material.

30. The portable travel tray of claim 29, wherein the magnetically receptive composite material comprises ferrite particles contained in an elastomeric matrix.

31. The portable travel tray of claim 12, wherein the rear, left and right sidewalls have a height of about two inches.

* * * * *